United States Patent [19]
Corbett

[11] Patent Number: 5,424,598
[45] Date of Patent: Jun. 13, 1995

[54] CRYSTAL FORCE AND PRESSURE TRANSDUCERS

[76] Inventor: James P. Corbett, 923 Ralermo Dr., Santa Barbara, Calif. 93105

[21] Appl. No.: 192,458

[22] Filed: Jan. 18, 1994

[51] Int. Cl.⁶ .................................. H01L 41/08
[52] U.S. Cl. ........................... 310/338; 310/144; 310/156; 73/774; 73/778
[58] Field of Search ............... 310/329, 338, 339, 366, 310/328; 73/517 R, 763, 703, 715, 717, 723, 753

[56] References Cited
U.S. PATENT DOCUMENTS

| | | | |
|---|---|---|---|
| 4,485,323 | 11/1984 | Corbett | 310/338 |
| 4,703,216 | 10/1987 | Corbett | 310/338 |
| 4,940,915 | 7/1990 | Scott et al. | 310/338 |

*Primary Examiner*—Mark O. Budd

[57] ABSTRACT

A force or fluid pressure transducer comprises a plate-like crystal. The force, to be measured, is applied by two seatings disposed on opposite edges of the crystal. The transducer can measure pressure when a diaphragm is added to provide the force.

Two portions of the crystal are maintained in continuous oscillation by feed-back circuits. These portions change their frequencies by different amounts when the force is changed. The difference between the two frequencies is a very accurate measure of the force and forms the output of the transducer.

Structures to secure the crystal have, in the past, proved difficult to manufacture. The present invention describes a securing structure for the crystal which substantially improves and facilitates securing and housing the crystal to provide high accuracy under all normal working conditions of the transducer.

20 Claims, 3 Drawing Sheets

CRYSTAL FORCE AND PRESSURE TRANSDUCERS

BACKGROUND OF THE INVENTION

This invention relates to oscillating crystal transducer systems of the type described in my U.S. Pat. Nos. 4,703,216, 4,485,323, 4,439,705, 4,175,243, 4,126,801, 4,067,241, 4,020,488, and 3,891,870.

According to these patents a force or fluid pressure transducer contains one or more plate-like oscillating crystals which sit up-right on seatings disposed on a base member which forms part of the transducer housing. Means are provided for transmitting a force to the crystal along the direction of its surface in order to produce, in response to said force a change of the resonant frequencies of the crystal.

The force may originate from a fluid pressure where it is required to measure this pressure being applied to a diaphragm which forms part of the transducer enclosure. The center-point of this diaphragm is arranged to apply the force to the crystal.

In the later patents the crystal has on it two oscillating portions, one of which is substantially un-responsive to the force. This arrangement is advantageous because the change in difference frequency between the two portions is a very accurate measure of the force.

Although in principle, the existing patents disclosed transducers which performed with increasing accuracy over a progressively wider range of conditions as development proceeded, difficulty in manufacturing the units in a satisfactory manner and thereafter providing adequate hermetic sealing has continued to exists. The present invention provides means to overcome these problems.

The earlier problems were such as to make the transducers unduly bulky and as a result the masses of the components could result in excessive sensitivity to shock and vibration.

Further, although the required position of the crystal between its seatings was known, it was difficult to adjust the crystal into this position by this means to reduce inaccuracies resulting from ambient temperature changes.

SUMMARY OF THE INVENTION

The invention comprises a quartz crystal having on it pairs of electrodes disposed on corresponding regions on opposite sides of the crystal. The crystal is maintained in continuous oscillation by a feedback circuit or circuits connected to said electrodes.

The change in the frequency of the oscillation originating from the crystal is responsive to the force to be measured. This force is applied by seatings disposed at the periphery of the crystal and directed along the plate surface.

The present invention resides in a U-shaped rigid clip inside which the crystal is secured by a plate-like spring which is essentially flat. This is fitted across the mouth of the clip. The securing permits accurate adjustment of the crystal position between seatings before insertion of the clip into the hermetically sealed housing. The adjustment is essential to attain high accuracy of measurement by the transducer particularly under conditions of variation of ambient temperature.

Heretofore, without this design of clip, (for exmple in the transducer shown in FIG. 4 of U.S. Pat. No. 4,485,323) it was excessively difficult to adjust the crystal in position and still maintain adequate accuracy of the transducer and at the same time provide hermetic sealing of the device.

DESCRIPTION OF PRIOR ART

Figure 1:
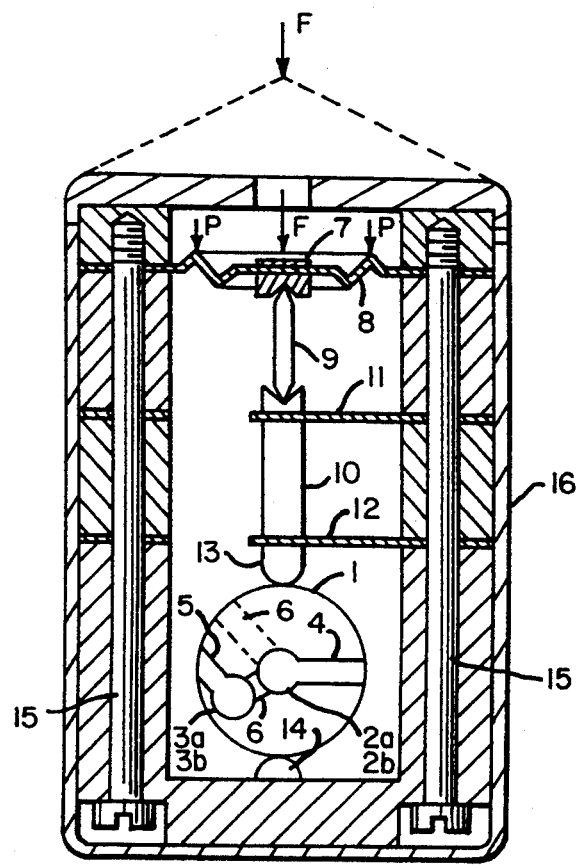
FIGS. 1 and 2 show prior art ane included to facilitate explanation. These are from my U.S. Pat. Nos. 4,175,243, and 4,480,323 respectively.

Referring firstly to the prior art in FIG. 1. (U.S. Pat. No. 4,175,243) a circular plate-like crystal 1 has on its surface two pairs of electrodes 2a and 2b, and 3a and 3b disposed on corresponding opposed areas on each side of the plate. Connection tabs 4 and 5 on the front of plate 1 and common connection tab 6 on the rear side enable feedback amplifiers to be connected to the electrodes to maintain them in continuous oscillation in the manner well-known in the communication industry. Force F applied to disc 7 in the center of disphragm 8 is carefully directed via pin 9 to spigot 10. This spigot is secured by two flat spring cantilevers 11 and 12. Only the vertical component of Force F is thus transmitted to the upper seating 13 which applies compression to crystal 1 along the direction of its surface. Lower seating 14 sits below crystal 1. Bolts 15 secure the housing rings to form a frame which sits inside a cannister 16. Said cannister together with lid 18 forms a hermetically sealed enclosure. Change of force F results in a difference frequency change between electrode pairs 2a, 2b and 3a, 3b. This difference frequency forms the transducer output.

Figure 2:
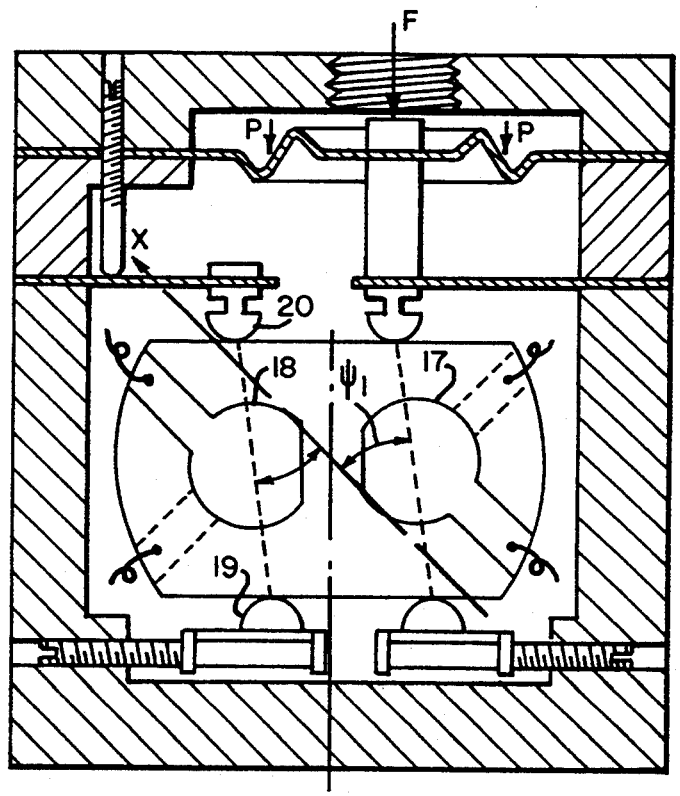

FIG. 2 shows a prior art transducer (U.S. Pat. No. 4,485,323) that is further improved. The improvements reside in reduction of crystal size by cutting away all of the crystal plate 1 except for the relevant part containing the electrode pairs. Higher stress level between the primary force-responsive electrode pair 17 results in substantially larger frequency change and higher accuracy of the transducer, as does also oscillation in overtone modes.

Further, as shown in FIG. 2, the second electrode pair 18 is arranged to have additional seatings 19 and 20 which permit adjustment to compensate for temperature change. However, later methods of achieving this compensation have proved more effective and these will be described in the text which follows.

DESCRIPTION OF THE PREPARED EMBODIMENTS

Figure 3:
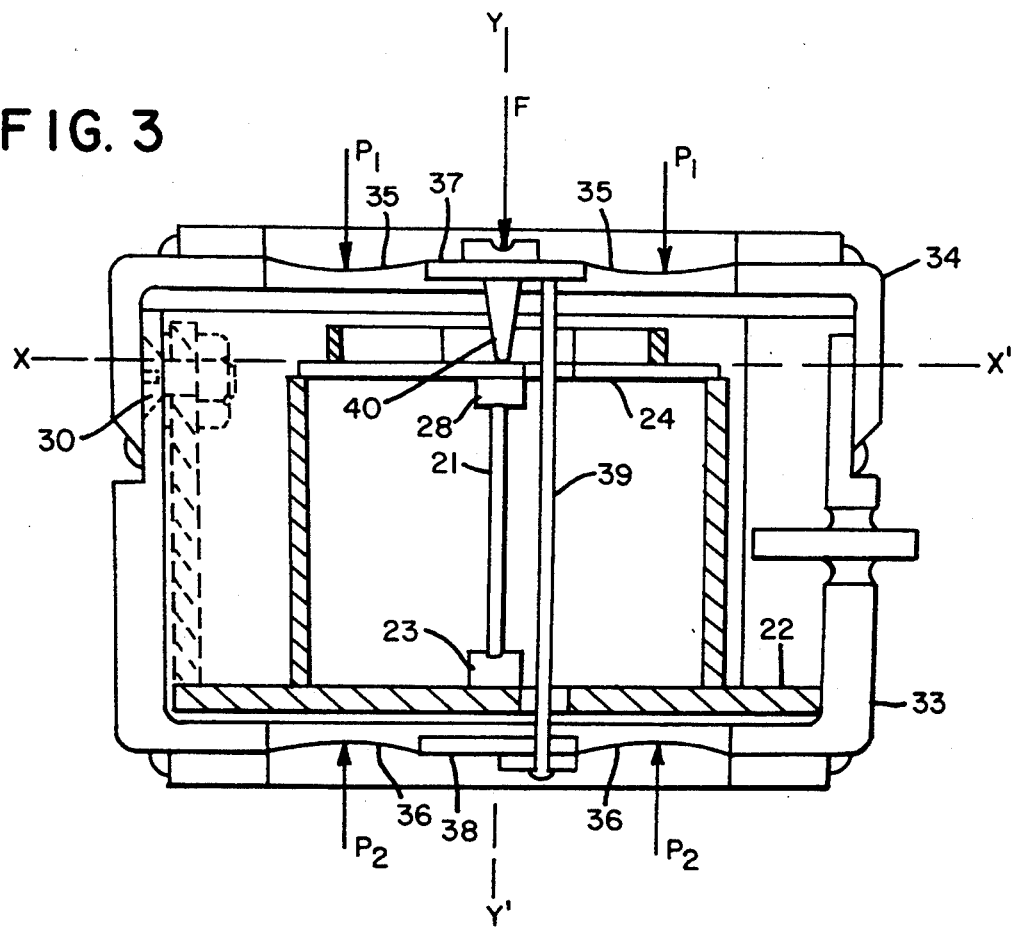
FIGS. 3 and 4 show plan and elevation views respectively of one configuration of the transducer incorporating the present invention.
Figure 4:
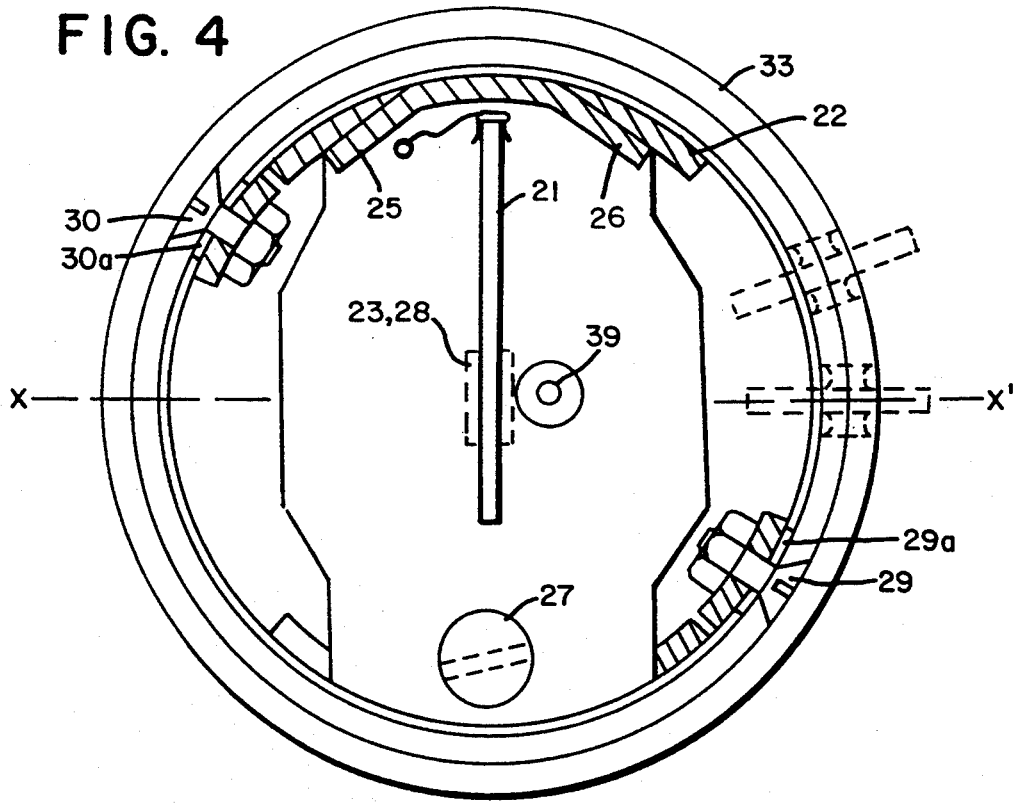
Figure 5:
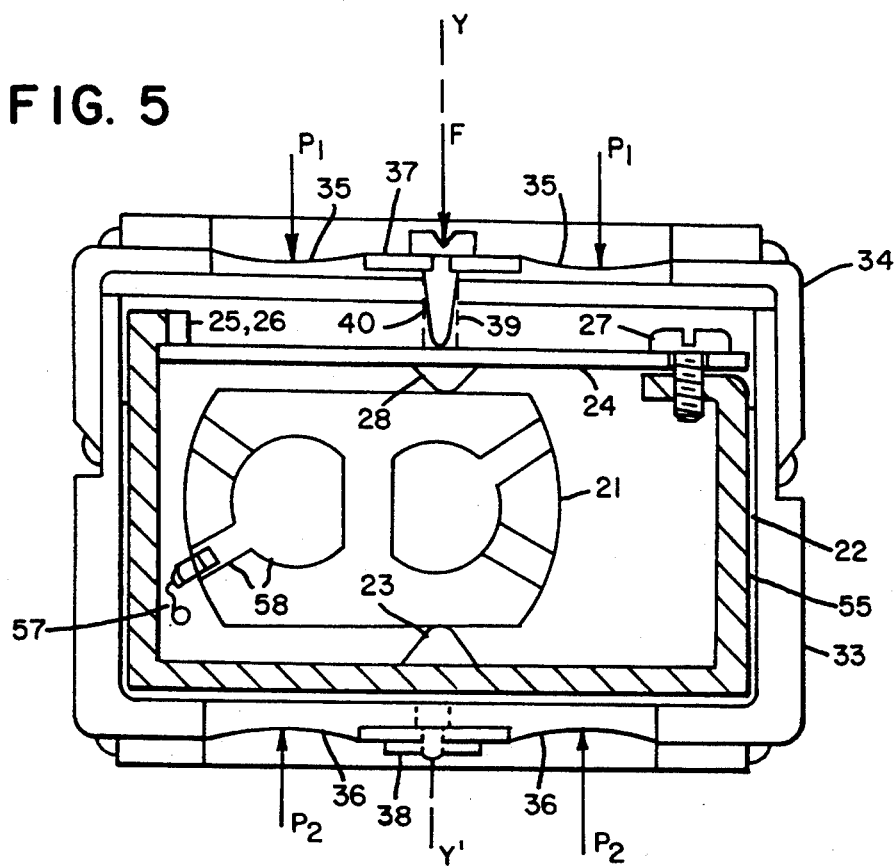
FIG. 5 shows a cross-sectional view of the transducer of FIG. 3.

Referring to FIGS. 3, 4 and 5 which are respectively plan and elevation views of the transducer of said FIG. 3., the new deveopment relies upon the following innovations:

Crystal 21 is mounted within a U-shaped frame 22. Said frame holds lower seating 23 for crystal 21 inside its base. U-shaped frame 22 is bridged at its mouth by flat spring member 24. The latter is secured at one end by projections 25 and 26 which are cut out from the top edge of said frame. The other end of spring 24 is secured by adjusting screw 27 shown in FIG. 5. This screw passes through a hole in said spring.

Upper seating 28 is secured to flat spring 24 and adjusting screw 27 is arranged to preload said seating 28 against the upper edge of crystal 21. Thus crystal 21 is firmly clamped between the seatings 23 and 28.

Frame 22 is secured by screws 29 and 30 which pass through anti-shock tabs 29a and 30a. These tabs are parts of said frame and thus secure the frame in a hermetically sealed enclosure 33 completed by lid 34. Both parts 33 and 34 have annular diaphragms 35 and 36 formed by plates 37 and 38 at the center of each. Said plates are joined by rod 39. Projection 40 from plate 37 enables force F to be transmitted to crystal 21 via spring 24 and seating 28.

Thus, if force F originates from a fluid pressure P applied to diaphragm 35 the change in the frequency of crystal 21 will be a direct measure of pressure P.

Further, if force F originates from the difference between two fluid pressures $P_1$ on diaphragm 35 and $P_2$ on diaphragm 36 then the frequency change of said crystal will be a measure of the difference between $P_1$ and $P_2$.

The hermetically sealed enclosure formed by housing 33 and lid 34 is either filled with a dry inert gas to obviate contamination of the crystal or in some applications the enclosure may be evacuated to provide very high accuracy units.

The transducer may also be used as a load cell to measure force F. Because pressure $P_1$ will equal $P_2$ the unit is compensated for ambient air-pressure changes.

Yet further, the differential pressure transducer can be employed for fluid flow rate measurement when it is used to sense pressure drop across an orifice.

Figure 6:
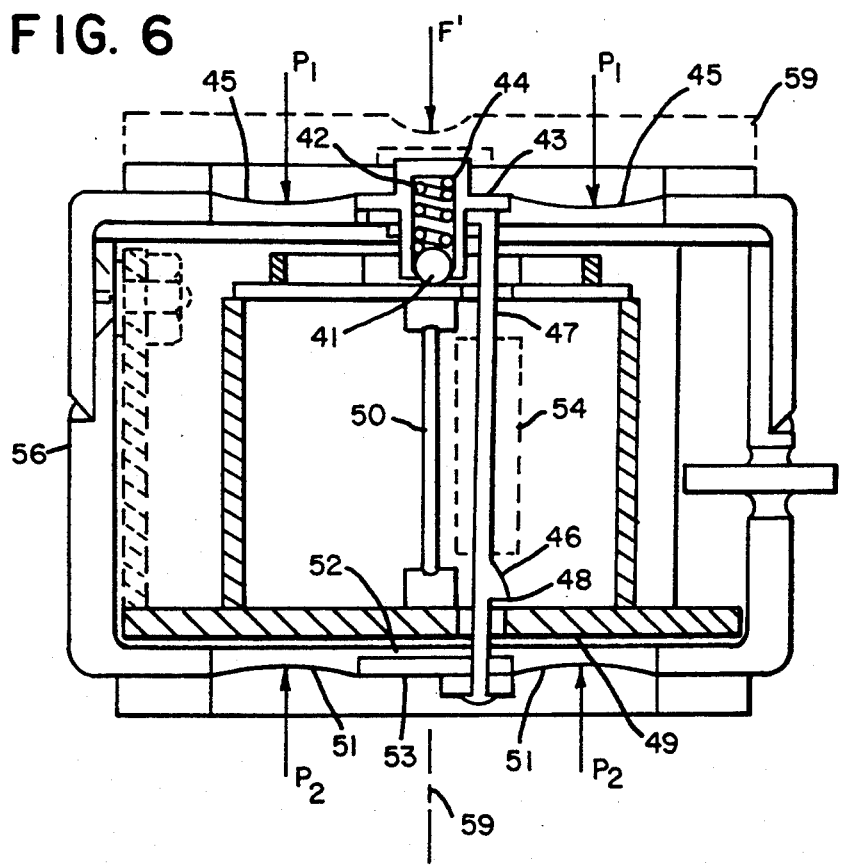
FIG. 6 shows a cross-sectional view of the transducer with overload relieafs and added features.

Reference is now made to FIG. 6 which shows the transducer of FIGS. 3, 4 and 5 but with the added features of overload reliefs which operate in the event of excess force above designed full range when applied at the upper or lower diaphragms.

The reliefs provide protection for the crystal particularly in the event of excessive direct load, shock or vibration to the transducer.

Protection of two kinds is afforded. Firstly protection is provided against catastrophic damage to the crystal and secondly prevention of significant shift of normal zero or fixed load output of the transducer. For example, double overload of the unit would not normally cause inferior operating of the transducer. However, the overload reliefs provide operation up to several times full rated load of the transducer.

In FIG. 6 protection is achieved by locating a stainless steel ball 41 in recess 42 within plate 43.

In normal operation ball 41 is held in the position shown, by coil spring 44. However, during large over-pressure on the top of diaphragm 45 spring 44 is compressed by said ball and over-pressure can increase until a projection 46 on rod 47 closes the gap 48 with the lower part of frame 49 whereupon no further force is introduced to crystal 50.

Yet further, if excessive pressure is applied to lower diaphragm 51 then gap 52 will be closed when stop 53 touches the underside of frame 30 thus avoiding undesirable excessive travel of said two diaphragms which would otherwise become deformed.

Another protective feature of the transducer consists in provision of an anti-shock mounting for frame 52 of FIG. 6. This is achieved by fitting a sheet of plastic 55 between frame 52 and enclosure 56, at the time said frame is fitted into said enclosure. The plastic provides a resilient and damped separating medium between the two parts and when the plastic having suitable characteristics is employed enables the transducer to withstand substantial shock and vibration without sustaining damage.

Tendency for crystal 50 to swivel in its seatings under shock conditions is counteracted by the careful selection of the length and thickness of the wires 57, connecting the crystal electrodes 58 to the maintaining circuit.

Reference to U.S. Pat. No. 4,439,705 shows that the mass loading features claimed therein can equally well be applied to the crystal used in this present invention to compensate for zero shift; i.e., undesired frequency shifts arising from the effect of ambient temperature change in the transducer.

Reference to U.S. Pat. No. 4,020,448 wherein oscillation of two crystals is claimed, shows that this principal could also be applied with advantage to additionally reduce the zero shift of the output signal in the current invention.

A further feature of the transducer is its alternative use as a linear accelerometer. The dashed line 54 in FIG. 6 shows the location of a mass which may be secured to rod 47.

With this mass the transducer becomes sensitive to acceleration along axis 59.

SUMMARY OF ADVANTAGES OVER EARLIER PATENTS

1. The crystal can be assembled into a frame and adjusted in position prior to insertion of said frame into the main housing which is subsequently hermetically sealed. This is a major improvement over my U.S. Pat. Nos. 4,175,243 and 4,480,323 wherein assembly of the crystal proved difficult.

2. The crystal is more firmly secured than in former Patents.

3. The overall assembly is more compact than in previous Patents.

4. The new assembly forms a differential pressure transducer in addition to its ability to be arranged for absolute pressure measurement as was formerly the case.

5. The new transducer is an improvement over the looped spring member of U.S. Pat. No. 4,940,915 which suffered inaccuracy from shock and vibration effects because the mass of said spring 24 arising from its total unsupported length including seating member 23 is significantly greater than that of the short flat spring bridging the U-shaped frame of the new invention described herein.

I claim:

1. A force and pressure transducer comprising:
    a plate-shaped piezo-electric crystal having a peripheral edge,
    a first pair of electrodes disposed on a corresponding region on opposite sides of a first portion of the crystal,
    a second pair of electrodes disposed on corresponding regions on opposite sides of a second portion of the crystal,
    means for energising the electrode pairs to maintain oscillation of the first and second crystal portions at difference frequencies,
    a U-shaped frame containing inside the bottom of its U-shape a first seating member engaging the peripheral edge of the crystal, a substantially flat leaf spring bridging the gap at the open end of the U-shaped frame and having on it a second seating member engaging the peripheral edge of the crystal and arranged to apply a force along a line extending through said first oscillating crystal portion to said first seating member.

2. A force and pressure transducer according to claim 1, including means for computing the difference frequency between the two oscillating portions and making this difference frequency available as the transducer output.

3. A force and pressure transducer according to claim 1 the pair of seating members being arranged in positions along the crystal periphery to cause the force sensitivity of the transducer output to be independent of temperature changes.

4. A force and pressure transducer according to claim 1, in which said first and second crystal portions are arranged to oscillate in an overtone mode.

5. A force and pressure transducer according to claim 1 in which said first crystal portion or said second crystal portion is arranged to oscillate in an overtone mode.

6. A force and pressure transducer according to claim 1 in which said first and second crystal portions are arranged to oscillate in different overtone modes.

7. A force and pressure transducer according to claim 1 in which the crystal is surrounded by a hermetically sealed enclosure.

8. A force and pressure transducer according to claim 1 in which said enclosure is filled with an inert gas.

9. A force and pressure transducer according to claim 1 in which said enclosure provides a vacuum in which the crystal resonates.

10. A force and pressure transducer according to claim 1 which is arranged to measure a single force.

11. A force and pressure according transducer to claim 1 which is arranged to measure the difference between two forces.

12. A force and pressure transducer according to claim 1 which is arranged to measure a single pressure.

13. A force and pressure transducer according to claim 1 which is arranged to measure the difference between two pressures.

14. A force and pressure transducer according to claim 1 in incorporating over-load features.

15. A force and pressure transducer according to claim 1 in which the force originates from a mass secured in such a manner as to apply the force due to acceleration of said mass to form an accelerometer.

16. A force and pressure transducer according to claim 1 in which undesired variation in frequency of the output signal with temperature is compensated by mass loading of the crystal plate.

17. A force and pressure transducer according to claim 1 in which an adjusting screw is provided to influence the magnitude of the force exerted by the spring upon the crystal.

18. A force and pressure transducer to claim 1 in which the frequency variation with temperature of said oscillating portions is employed to compensate the transducer output for the effect of temperature variation of the transducer.

19. A force and pressure transducer according to claim 1 in which the electrical connections to the resonators are additionally employed to secure the crystal in its position under shock and vibration conditions.

20. A force and pressure transducer according to claim 1 in which said U-shaped frame is supported within said hermetically sealed enclosure by damping material in such a manner as to provide shock resistance of the completed transducer.

* * * * *